United States Patent
Skalecki et al.

(10) Patent No.: US 10,116,552 B2
(45) Date of Patent: Oct. 30, 2018

(54) EFFICIENT SHARED RISK GROUP REPRESENTATION AS A BIT VECTOR

(71) Applicant: Ciena Corporation, Hanover, MD (US)

(72) Inventors: Darek Skalecki, Ottawa (CA); Gerard L. Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 23 days.

(21) Appl. No.: 15/452,878

(22) Filed: Mar. 8, 2017

(65) Prior Publication Data
US 2018/0262421 A1 Sep. 13, 2018

(51) Int. Cl.
| | |
|---|---|
| H04L 12/703 | (2013.01) |
| H04L 12/751 | (2013.01) |
| H04L 12/715 | (2013.01) |
| H04L 12/781 | (2013.01) |

(52) U.S. Cl.
CPC .............. *H04L 45/28* (2013.01); *H04L 45/02* (2013.01); *H04L 45/46* (2013.01); *H04L 45/52* (2013.01)

(58) Field of Classification Search
CPC ......... H04L 45/28; H04L 45/02; H04L 45/46; H04L 45/52
See application file for complete search history.

(56) References Cited

U.S. PATENT DOCUMENTS

| | | | |
|---|---|---|---|
| 8,296,407 B2 | 10/2012 | Doshi et al. | |
| 8,456,984 B2 | 6/2013 | Ranganathan et al. | |
| 8,515,280 B1 | 8/2013 | Li et al. | |
| 8,576,708 B2 | 11/2013 | Gandhi et al. | |
| 8,824,334 B2 | 9/2014 | Vasseur et al. | |
| 8,854,955 B2 | 10/2014 | Prakash et al. | |
| 8,867,333 B2 | 10/2014 | Doshi et al. | |
| 9,167,318 B1 | 10/2015 | Connolly et al. | |
| 9,197,355 B2 | 11/2015 | Swinkels et al. | |
| 9,497,521 B2 | 11/2016 | Sareen et al. | |
| 2010/0172236 A1 | 7/2010 | Madrahalli et al. | |
| 2014/0126355 A1* | 5/2014 | Filsfils ................... | H04L 45/66 370/225 |
| 2014/0226967 A1* | 8/2014 | Ahuja ..................... | H04L 45/22 398/5 |
| 2014/0258486 A1 | 9/2014 | Filsfils et al. | |

(Continued)

OTHER PUBLICATIONS

Mannie, Network Working Group, Standards Track, Generalized Multi-Protocol Label Switching (GMPLS) Architecture, The Internet Society, Oct. 2004, pp. 1-69.

(Continued)

*Primary Examiner* — Jae Y Lee
(74) *Attorney, Agent, or Firm* — Clements Bernard Walker PLLC; Christopher L. Bernard; Lawrence A. Baratta, Jr.

(57) ABSTRACT

Systems and methods of path computation using an efficient shared risk group representation include representing a plurality of network risks in a network with a bit vector where each network risk is represented as a single bit in the bit vector; computing a pair of paths through the network; and determining diversity of the pair of paths based on a comparison of associated bit vectors for each of the pair of paths. The bit vector can include M-bits with an N-bit Group Identifier and P-bits with each of the P-bits representing a unique risk of the plurality of network risks, wherein M, N, and P are integers and N+P=M.

17 Claims, 9 Drawing Sheets

(56) References Cited

U.S. PATENT DOCUMENTS

2016/0112327 A1    4/2016  Morris et al.
2016/0164739 A1    6/2016  Skalecki

OTHER PUBLICATIONS

Kompella et al., Network Working Group, Standards Track, OSPF Extensions in Support of Generalized Multi-Protocol Label Switching (GMPLS), The Internet Society, Oct. 2005, pp. 1-11.
Li et al., Network Working Group, Standards Track, IS-IS Extensions for Traffic Engineering, Redback Networks, Inc., Oct. 2008, pp. 1-17.
Farrel et al., Internet Engineering Task Force (IETF), Best Current Practice, ISSN: 2070-1721, Problem Statement and Architecture for Information Exchange between Interconnected Traffic-Engineered Networks, Jul. 2016, pp. 1-67.
ITU-T, Telecommunication Standardization Sector of ITU, G.8080/Y.1304, Architecture for the automatically switched optical network, Feb. 2012, pp. 1-124.

* cited by examiner

| Bit Group | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 629 | 6789 | 4011 | 4012 | 4031 | 4032 | 2111 | 2333 | 2102 | 2103 | 2104 | 2304 | 6123 | 4211 | 4212 | 4031 | |
| 926 | 9876 | 4051 | 4052 | 2555 | 2305 | 4051 | | | | | | | | | | |
| 2242 | 4021 | 2222 | 2203 | 2204 | 4221 | 4222 | | | | | | | | | | |
| 2444 | 4041 | 4042 | 2444 | | | | | | | | | | | | | |

*FIG. 1C*

EFFICIENT SHARED RISK GROUP REPRESENTATION AS A BIT VECTOR

FIELD OF THE DISCLOSURE

The present disclosure generally relates to networking systems and methods. More particularly, the present disclosure relates to systems and methods for efficient Shared Risk Group (SRG) representation as a bit vector providing compression and more efficient comparisons.

BACKGROUND OF THE DISCLOSURE

Shared Risk Group (SRG) is a concept in network routing that different connections may suffer from a common failure if they share a common risk or a common SRG. SRG can also be used with optical networks, Ethernet networks, Multiprotocol Label Switching (MPLS) networks including the Generalized Multiprotocol Label Switching (GMPLS) networks, Internet Protocol (IP) networks, and the like as well as multi-layer networks with any of the foregoing. An SRG failure makes multiple connections go down because of the failure of a common resource those connections share. Examples of SRGs include Shared Risk Link Group (SRLG), Shared Risk Node Group (SRNG), Shared Risk Equipment Group (SREG), etc. The descriptions herein reference SRLGs, but those skilled in the art will recognize any type of SGR risk representation is contemplated herein. SRLGs refer to situations where links in a network share a common fiber (or a common physical attribute such as fiber conduit or the like). If one link fails, other links in the group may fail too, i.e., links in the group have a shared risk which is represented by the SRLG. SRLGs are used in optical, Ethernet, MPLS, GMPLS and/or IP networks and used for route computation for diversity. In multi-layer networks, a link at upper layer represents a connection at lower layer and thus any network resources (links, nodes, line cards, and the like) used by the lower layer connection can be represented as SRLGs on the upper layer links. For example, an MPLS link at MPLS layer may represent a connection at Layer 0 and thus any ROADM nodes, amplifiers, and muxing/demuxing components as well as fiber cables and conduits used by the Layer 0 connection can be represented as SRLGs on the MPLS link. It is thus possible that links have a large number of SRLGs assigned and thus an efficient representation of SRLGs is highly desirable, both for storage, dissemination (flooding) as well as path diversity computation purposes.

Conventionally, each specific SRLG is a unique 32-bit number (or some other large number) that is assigned against associated links in a network. For diversity route computation, the process of checking for diversity includes sorting all of the SRLGs between each link for comparison and checking if any of the same SRLG is present. The absence of SRLGs between links indicates no common failures. If a particular link has four SRLGs, that link has four 32-bit numbers associated with it (i.e., flooded in advertisements, stored at network elements, used in diversity route computation, etc.). This becomes particularly complex and unmanageable in multi-layer networks. For example, assume 20 SRLGs per link at Layer 0 (photonic layer) in a network and 20 links for a Layer 0 connection, there could be 400+ SRLGs to track for the Layer 0 connection. Assume a higher layer protocol, e.g., MPLS, operates on the Layer 0 network. There is a finite number of SRLGs for the higher layer protocol, e.g., 32, 40, etc. that can be tracked for each MPLS link. It may not be possible to track all of the SRLGs of the Layer 0 connection when such connection at Layer 0 represents an MPLS link at MPLS layer. Conventional approaches here include prioritizing the SRLGs at the higher layer protocol and ignoring less important SRLGs (e.g., not assigning them) from lower layers. However, as networks continue to scale and management of these networks is performed on a multi-layer fashion, this approach does not work.

There are techniques for compressing SRLGs such as the Macro SRLG technique (see Request for Comments (RFC) 7926, Appendix B.1, July 2016, the contents of which are incorporated herein) which stipulates that an SRLG representing a particular network risk need only be assigned against a link if two or more such links make use of such network risk. When upper-layer links sparsely use the underlying network (L0) infrastructure then Macro SRLGs would offer good summarization capabilities but as more and more upper-layer links are added on top of network (L0) infrastructure then the chances are high that two or more such upper-layer links will use a particular network risk and thus a large number of SRLGs representing these network risks would need to be assigned to the links.

Again, based on network scaling and the management of multi-layer networks, there is a need for efficient SRLG representations.

BRIEF SUMMARY OF THE DISCLOSURE

In an exemplary embodiment, a method of path computation using an efficient shared risk group representation includes representing a plurality of network risks in a network with a bit vector where each network risk is represented as a single bit in the bit vector; computing a pair of paths through the network; and determining diversity of the pair of paths based on a comparison of associated bit vectors for each of the pair of paths. The bit vector can include M-bits with an N-bit Group Identifier and P-bits with each of the P-bits representing a unique risk of the plurality of network risks, wherein M, N, and P are integers and N+P=M. Optionally, M=32 and the bit vector is used in place of a Shared Risk Link Group of 32-bits which represents a single risk. The Group Identifier can be used to cluster the plurality of network risks based on one or more of network topology, geography, upper layers, and clustering to find a largest number of the P-bits intersecting between groups. The plurality of network risks can be flooded as the associated bit vectors via a control plane. The determining of the diversity can be based on a bitwise comparison of the associated bit vectors. The plurality of network risks can be defined at one or more lower layers and pushed to one or more upper layers higher than the lower layers as the associated bit vectors.

In another exemplary embodiment, an apparatus for path computation using an efficient shared risk group representation includes circuitry configured to represent a plurality of network risks in a network with a bit vector where each network risk is represented as a single bit in the bit vector; circuitry configured to compute a pair of paths through the network; and circuitry configured to determine diversity of the pair of paths based on a comparison of associated bit vectors for each of the pair of paths. The bit vector can include M-bits with an N-bit Group Identifier and P-bits with each of the P-bits representing a unique risk of the plurality of network risks, wherein M, N, and P are integers and N+P=M. Optionally, M=32 and the bit vector is used in place of a Shared Risk Link Group of 32-bits which represents a single risk. The Group Identifier can be used to cluster the plurality of network risks based on one or more of network topology, geography, upper layers, and clustering to find a largest number of the P-bits intersecting between groups. The plurality of network risks can be flooded as the associated bit vectors via a control plane. The circuitry configured to determine the diversity can perform a bitwise comparison of the associated bit vectors. The plurality of network risks can be defined at one or more lower layers and pushed to one or more upper layers higher than the lower layers as the associated bit vectors.

In a further exemplary embodiment, a network element configured for path computation using an efficient shared risk group representation includes one or more ports supporting connections thereon; and a controller communicatively coupled to the one or more ports and configured to represent a plurality of network risks in a network with a bit vector where each network risk is represented as a single bit in the bit vector, compute a pair of paths through the network, and determine diversity of the pair of paths based on a comparison of associated bit vectors for each of the pair of paths. The bit vector can include M-bits with an N-bit Group Identifier and P-bits with each of the P-bits representing a unique risk of the plurality of network risks, wherein M, N, and P are integers and N+P=M. Optionally, M=32 and the bit vector is used in place of a Shared Risk Link Group of 32-bits which represents a single risk. The Group Identifier can be used to cluster the plurality of network risks based on one or more of network topology, geography, upper layers, and clustering to find a largest number of the P-bits intersecting between groups. The plurality of network risks can be flooded as the associated bit vectors via a control plane. To determine diversity, the controller can perform a bitwise comparison of the associated bit vectors.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a table of an example of SRLG bit vectors applied to the SRLGs in the network illustrated in FIG. 1A;

DETAILED DESCRIPTION OF THE DISCLOSURE

Again, in various exemplary embodiments, the present disclosure relates to systems and methods for efficient Shared Risk Group (SRG) representation as a bit vector providing compression and more efficient comparisons. As described herein, conventional approaches for each risk representation include a unique 32-bit value for each risk. The systems and methods herein propose the use of a single bit for each risk rather than the 32-bit value thereby reducing storage locally at network elements and bandwidth requirements over the network for flooding. Again, the foregoing descriptions reference SRLGs for illustration purposes. SRLGs are used to ensure diversity between connections such as in a distributed control plane and these SRLGs are distributed or flooded via routing protocols. The systems and methods can be used to assign network risk information to links and to make this information available to a control plane, Software Defined Networking (SDN) controller, Network Management System (NMS), Element Management System (EMS), etc. to make intelligent routing decisions, such as when reroutes are needed due to failures.

Exemplary Network with SRLGs

Figure 1A:
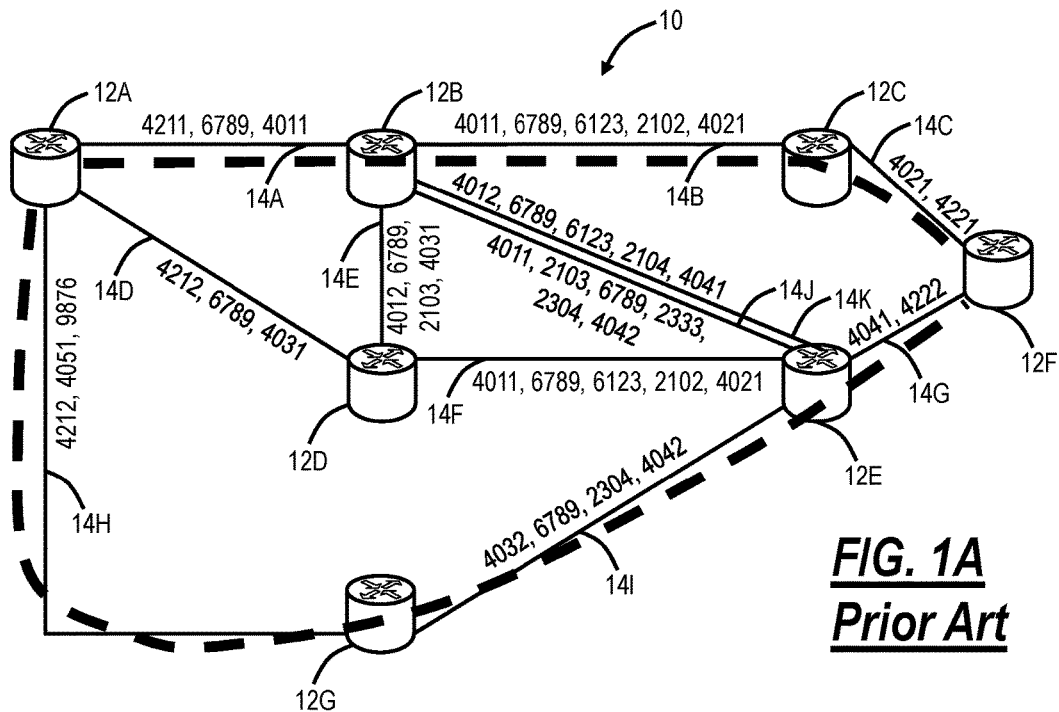
FIGS. 1A and 1B are network diagrams of a network of network elements interconnected by links with FIG. 1A illustrating the conventional approach of each risk in an SRLG being represented by a unique 32-bit number and FIG. 1B illustrating the systems and methods herein representing each risk as a single bit.
Figure 1B:
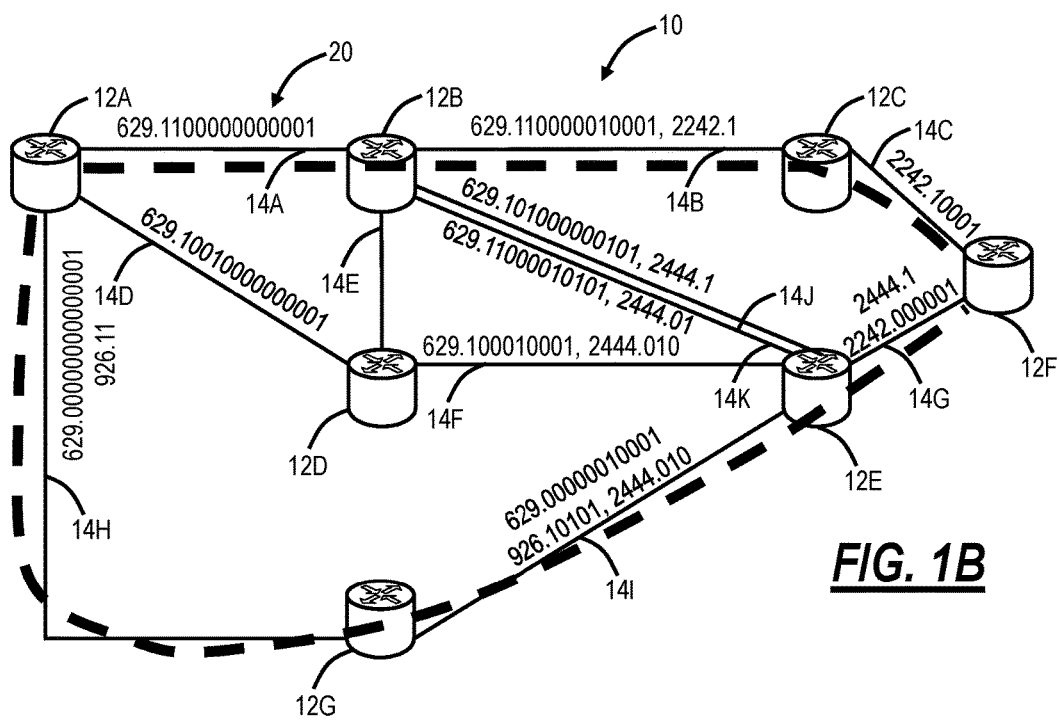
Figure 6:
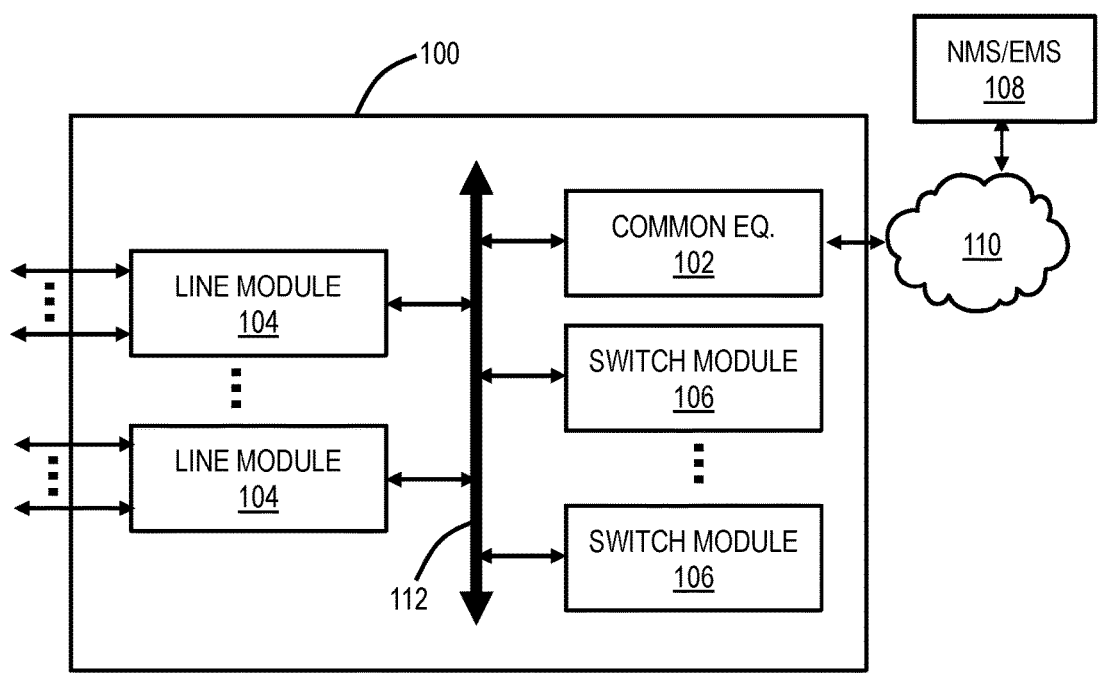
FIG. 6 is a block diagram of an exemplary node for use with the systems and methods described herein.

Referring to FIGS. 1A and 1B, in an exemplary embodiment, network diagrams illustrate a network 10 of network elements 12 (labeled as network elements 12A-12G) interconnected by links 14 (labeled as links 14A-14I). The network elements 12 communicate with one another over the links 14 through Layer 0 (L0) such as optical wavelengths (DWDM), Layer 1 (L1) such as OTN, Layer 2 (L2) such as Ethernet, MPLS, etc., Layer 3 (L3) protocols, and/or combinations thereof. The network elements 12 can be network elements which include a plurality of ingress and egress ports forming the links 14. The network elements 12 can be switches, routers, cross-connects, etc. operating at one or more layers. An exemplary network element 12 implementation is illustrated in FIG. 6. The network 10 can include various services or calls between the network elements 12. Each service or call can be at any of the L0, L1, L2, and/or L3 protocols, such as a wavelength, a Subnetwork Connection (SNC), a Label Switched Path (LSP), etc., and each service or call is an end-to-end path and from the view of the client signal contained therein, it is seen as a single network segment. The network 10 is illustrated, for example, as an interconnected mesh network, and those of ordinary skill in the art will recognize the network 10 can include other architectures, with additional network elements 12 or with fewer network elements 12, etc. as well as with various different interconnection topologies and architectures.

The network 10 can include a control plane operating on and/or between the network elements 12. The control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements 12; calculation and creation of paths for calls or services; network level protection and restoration; and the like. In an exemplary embodiment, the control plane can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane can utilize any type of control plane for controlling the network elements 12 and establishing, maintaining, and restoring calls or services between the nodes 12.

FIG. 1A illustrates SRLGs on each of the links 14 using the conventional approach with one unique 32-bit value per risk while FIG. 1B illustrates SRLGs on each link 14 using a single bit per risk. Again, SRLGs are risks that are compared between two potential paths to ensure diversity therebetween. The risks can include, without limitation, fibers, fiber conduits, physical junctions, bridges, Reconfigurable Optical Add/Drop Multiplexer (ROADM) degree, network element 12, module in the network element 12, or any physical construct associated with the link 14 physically. For diversity, the SRLGs between two connections are compared, and any shared risk indicates a diversity concern or single point of failure for both connections. The objective of SRLGs is to model various risks to enable comparison during route computation.

In FIG. 1A, each link 14 is assigned associated SRLGs for risks, and each is a unique 32-bit value. Note, for illustration purposes, FIG. 1A lists each risk as a four-digit number, but those skilled in the art will recognize these are meant to indicate a 32-bit value. For example, the link 14A has SRLGs 4211, 6789, 4011 and the link 14B has SRLGs 4011, 6789, 6123, 2102, 4021. In route computation, the fact these two links 14A, 14B have the same SRLGs 6789, 4011 indicates these links 14A, 14B have a common risk and are not diverse. The link 14H has SRLGs 4212. 4051, 9876 and when compared to the link 14A, there are no common SRLGs and thus these two links 14A, 14H are diverse, i.e., no common risk. As mentioned herein, use of 32-bit values for each SRLG requires flooding 3 32-bit values for the link 14A, 5 32-bit values for the link 14B, etc. This requires additional bandwidth, storage at the network elements 12, and processing power during route computation to perform the sorting and comparison. For example, to perform the comparison using unique 32-bit values, these values must be sorted and compared to see if there are any common SRLGs between two links 14. Thus, the conventional approach requires additional bandwidth for flooding, additional storage at the network elements 12, and additional processing for comparison.

For example, a fiber cable between Toronto and Ottawa may be assigned an SRLG=12345 (represented as a 32-bit value) whereas another fiber cable between Ottawa and Montreal may be assigned an SRLG=98765 (again, a 32-bit value). These assignments can occur at the optical layer, and the SRLG values are assigned against upper-layer links (e.g., Ethernet, MPLS, IP, etc.) that uses these network risks. For example, a link 14 between Toronto and Montreal and passing through the fiber cables between Toronto and Ottawa and Ottawa and Montreal may be assigned SRLG={12345, 98765}. As described herein, many network operators and their networks suffered from the problem of too many SRLGs being assigned to the links 14 and pushed to network elements 12 to perform diverse route calculations. For example, in L0 assume there are up to 20 SRLGs assigned per L0 link 14 and a L0 SNC may traverse a 20 hop route and thus may be associated with 20×20=400 SRLGs. Furthermore, such L0 SNC may be represented as a packet layer link (PKT Link) requiring 400 SRLGs to be assigned to it and thus 400 32-bit values conventionally.

In FIG. 1B, the same risks from FIG. 1A are assigned for SRLGs using the systems and methods herein using a single bit instead of a unique 32-bit number. Specifically, the systems and methods replace the unique 32-bit number for each risk with an M-bit vector with each bit representing a risk. Advantageously, this approach can provide significant compression, e.g., a single 32-bit vector could represent up to 32 different network risk. For example, rather than assigning 400 32-bit SRLG values against a packet link, theoretically, as few as 400/32 or 13 32-bit vectors are required. To differentiate between traditional 32-bit numbers representing each SRLG, the systems and methods refer to an SRLG bit vector (SRLBG). In a simple example, assume a network has 32 risks, e.g., 32 fiber cables, etc. Each fiber cable can be assigned an index 1 . . . 32 and any length path through this network could be represented by a single 32-bit vector. If the path represented an upper-layer link, then the link could be assigned a single 32-bit SRLGBV. This can be contrasted with the traditional SRLG approach where an upper-layer link supported by an N-hop fiber cable path would be represented using N SRLGs—a benefit of one 32-bit value versus N 32-bit values. In an exemplary embodiment, these SRLGBVs are used to represent network risks at the network elements 12 for diversity calculations, providing reduced storage, reduced bandwidth, and more efficient computation.

SRLG Bit Vector Definition

The SRLGBV is an M-bit representation of network risk, i.e., SRLG values, with the following structure:

| M-bits | |
| --- | --- |
| N-bits | P-bits |
| Group Identifier (ID) | Bit Vector with each bit representing a unique risk |

Specifically, the SRLG bit vector is M bits long. Note, all of the examples herein contemplate a 32-bit vector, i.e., M=32, but those skilled in the art recognize any value of M is contemplated. In the previous example for the SRLGBV, it was assumed all bits were used to represent a risk uniquely. In another exemplary embodiment, N bits are used as a group ID (also referred to herein as a cluster ID). The group ID is meant to uniquely identify each SRLGBV in network cases where more than one SRLGBV is needed. Various approaches are described herein for grouping or clustering with the group ID, e.g., geographical, based on network architecture (e.g., rings), based on risk groupings, etc. Those of ordinary skill in the art will recognize any approach is contemplated for the group ID.

With this structure, $2^N$ groups of (M-N) 1-bit SRLGs can be represented. Assume M=32 and N=16, there are $2^{16}$=65536 groups each with 16 1-bit elements where each element represents a network risk (SRLG). This can represent 65536×16=1048576 (i.e., over a million) different network risks, i.e., likely a value greater than any network operator will ever need. Using the traditional SRLG representation, such 1048576 network risks would require 1048576 (32-bit) SRLGs and using the aforementioned SRLGBV representation, such 1048576 network risks require 65536 (32-bit) SRLGBVs thereby leading to a compression ratio of 16× (i.e., 65536 versus 1048576). Note that compression ratio depends on the N value, e.g., N=14 yields a compression ratio of 18×, i.e., the compression ratio is (M-N).

SRLGBV Example

Referring to FIG. 1C, in an exemplary embodiment, a table illustrates an example of SRLGBVs 20 applied to the SRLGs in the network 10 illustrated in FIG. 1A. Again in FIG. 1A, the SRLGs are represented as four digit numbers, and there is a total of 30 SRLGs in this example. In the network 10, assume there are four different Central Offices (COs) and for a clustering/grouping, assume the risks associated with each CO are represented by a different SRLGBV, i.e., four group IDs—referred to in FIGS. 1B and 1C as 629, 926, 2242, 2444. The table in FIG. 1C includes four rows of the four group IDs (header listed as bit group) in the first 16 bits and the second 16 bits are listed in columns with the associated SRLG from FIG. 1A assigned to a unique bit in each group ID. Note, this example uses a 16-bit group ID and 16 bits for the unique risks. Since there are only 30 SRLGs in FIG. 1A, it would also be possible to simply have a single SRLGBV covering all 30 SRLGs.

In FIG. 1A, the link 14A has SRLGs 4211, 6789, 4011—again, in the conventional approach, this requires 3 32-bit SRLG representations. In FIG. 1C, the link 14 can now only have one 32-bit SRLG of 629.1100000000001 where the first 16 bits are 629, the group ID, and the second 16 bits of 1100000000001 represent the three SRLGs 4211, 6789, 4011 from FIG. 1A. Similarly, the link 14J has five SRLGs in FIG. 1A, but only requires two SRLGBVs in FIG. 1B. Similar reductions in the number of representations are shown on the other links.

Again, for comparing the SRLGs in diversity computations, the link 14A has SRLGs 4211, 6789, 4011 and the link 14B has SRLGs 4011, 6789, 6123, 2102, 4021. In route computation in FIG. 1A, the fact these two links 14A, 14B have the same SRLGs 6789, 4011 indicates these links 14A, 14B have a common risk and are not diverse. The link 14H has SRLGs 4212, 4051, 9876 and when compared to the link 14A, there are no common SRLGs and thus these two links 14A, 14H are diverse, i.e., no common risk. Here, the individual 32-bit SRLGs have to be sorted and compared. This process is computationally efficient with the SRLG-BVs. Taking the example of links 14A, 14B, a simple bit-wise AND function can be performed to determine if there is a shared risk, e.g., 629.1100000000001 (link 14A) AND 629.110000010001 (link 14B). Here, there will be 1s in the 16-bit representation field for the risks indicating the presence of common risks. Note, it is not required to perform this process with the SRLGBV 2242.1 on the link 14B since this is not present on the link 12A.

SRLG Bit Vector Process

Figure 2:
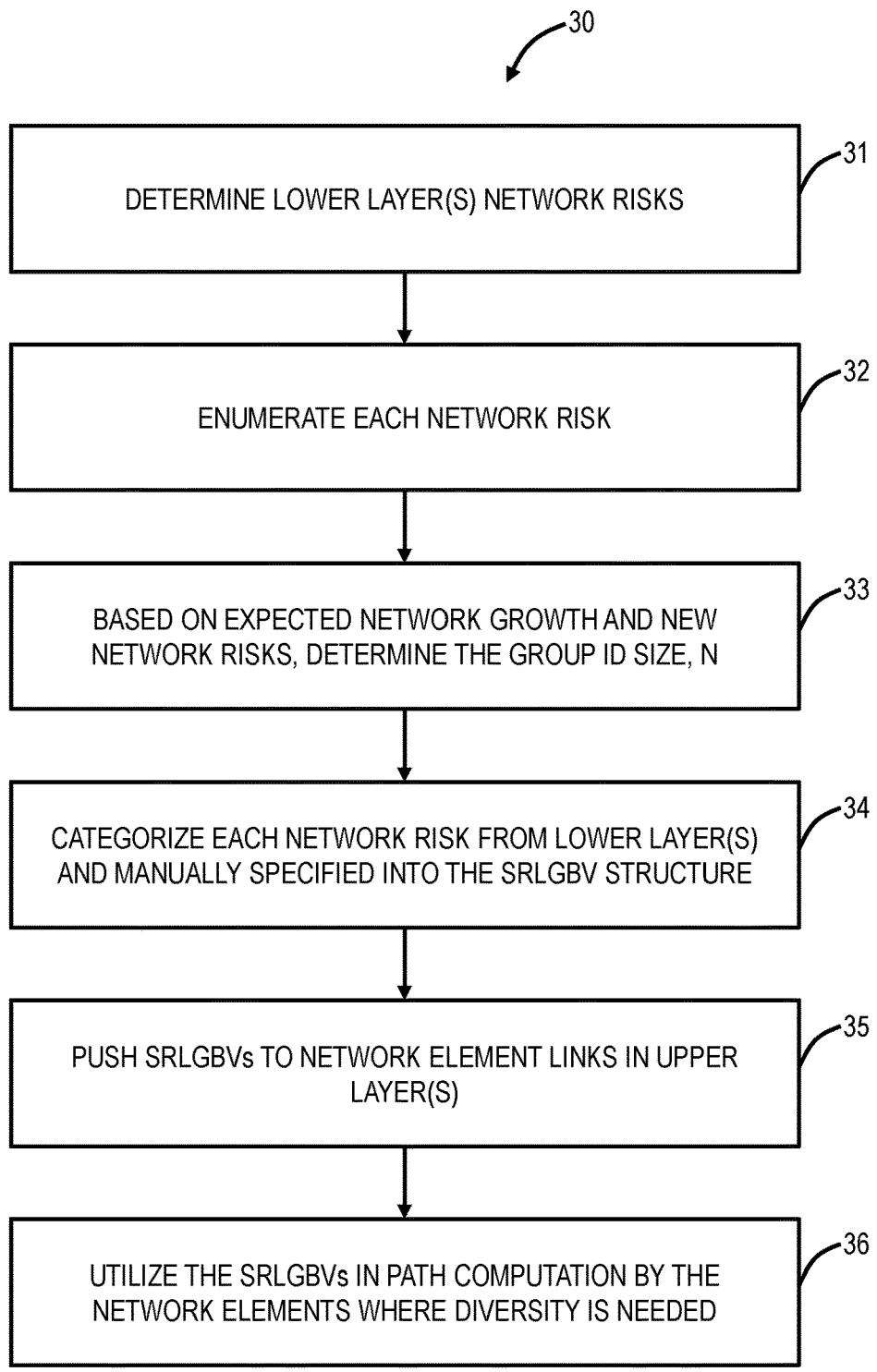
FIG. 2 is a flowchart of an SRLG bit vector process using the systems and methods described herein.

Referring to FIG. 2, in an exemplary embodiment, a flowchart illustrates an SRLGBV process 30 using the systems and methods described herein. The SRLGBV process 30 contemplates an automatic approach to defining SRLG groups/clusters. However, the SRLG groups/clusters can also be manually defined or adjusted as described herein. The SRLGBV process 30 can also be implemented in a Software Defined Networking (SDN) environment. The SRLGBV process 30 includes determining lower layer(s) network risks (step 31). These lower layer(s) have network risks of concern to network operators, e.g., conduits, cables, ROADM degrees, sites, etc. Each network risk is enumerated (step 32), e.g., 1, 2, 3, 4, . . . , K and the network operator can name/label each such network risk, e.g., a cable between Charlotte and Raleigh. A group ID size, N, is determined based on expected network growth and new network risks (step 33). For example, if expected network growth is less than 1048576 different network risks (discovered from the lower layer(s) and manually specified) then N=16 should suffice for all network operators. Note that the lower the N value, the better the compression ratio will be thus N should be chosen carefully considering the expected growth and number of risks.

Each network risk from the lower layer(s) and manually specified is categorized into the SRLGBV structure (step 34). The SRLGBVs are pushed to network element links in the upper layer(s) to be used in the network element path calculations where diversity is needed (step 35) (e.g., Constrained Shortest Path First (CSPF). Finally, the network elements utilize the SRLGBVs in path computation where diversity is needed (step 36). For example, after two paths are chosen, a bitwise comparison is performed between associated SRLGBVs for each path and the presence of the same risk indicates a shared risk and lack of diversity. The path computation can be performed again to find a diverse path (no shared risks) or a minimally diverse path (least amount of shared risks). Note that if ever the network growth approaches the limits defined by N, then a reconfiguration will be required, i.e., new N value is chosen and new categorizations into SRLGBVs are performed, and such SRLGBVs pushed to the network elements.

Clustering

Figure 3A:
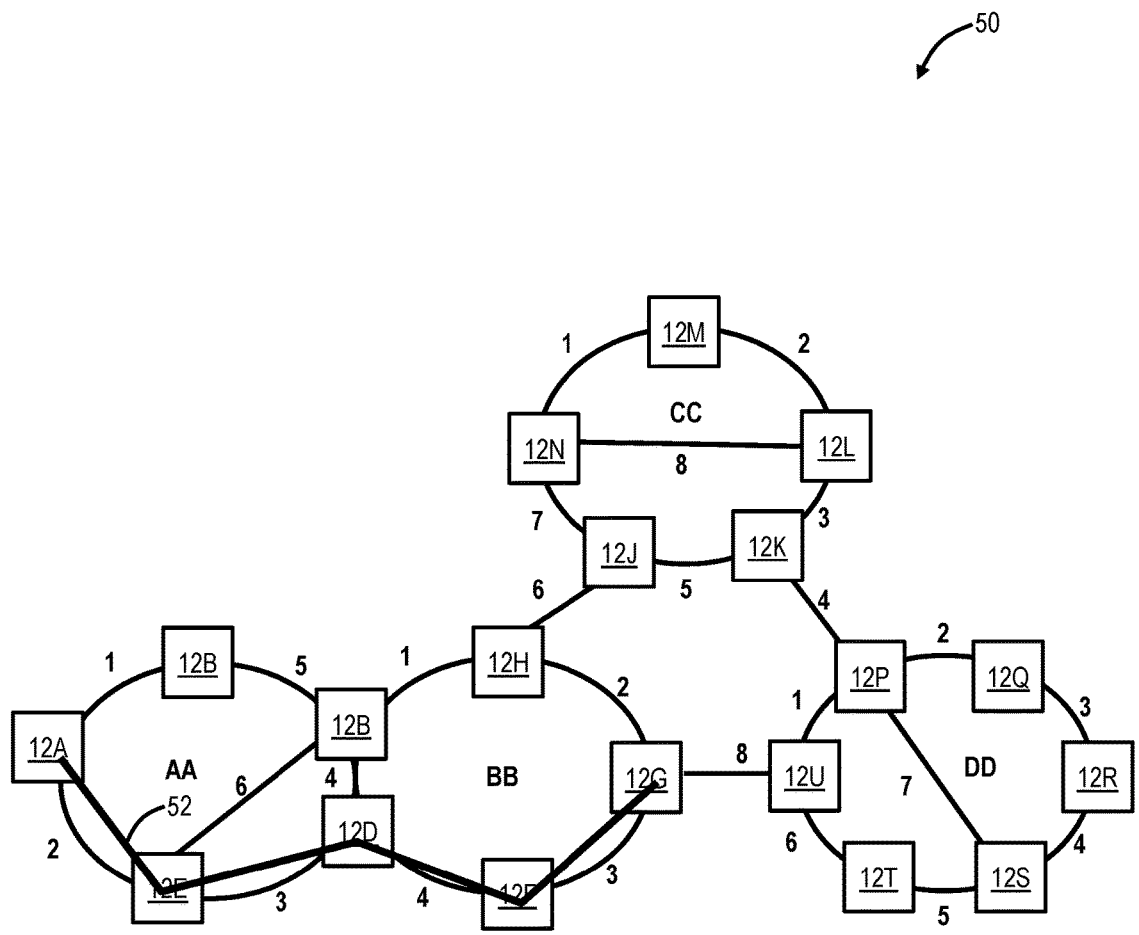
FIGS. 3A and 3B are network diagrams of a network with four interconnected rings for describing an approach to the group ID.
Figure 3B:
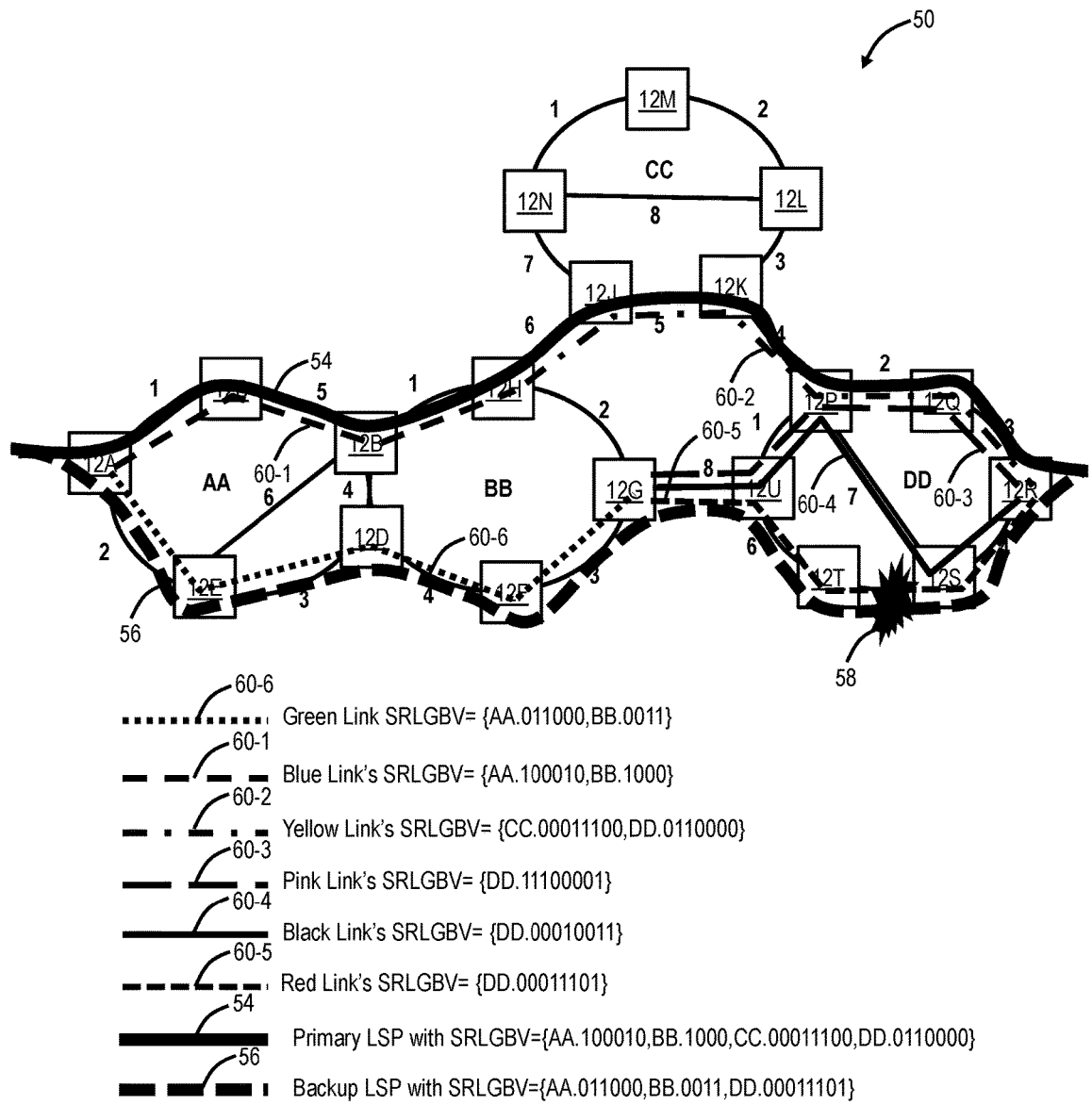

Referring to FIGS. 3A and 3B, in an exemplary embodiment, network diagrams illustrate a network 50 with four interconnected rings AA, BB, CC, DD for describing an approach to the group ID. The network 50 includes nodes 12A-12U and the four rings AA, BB, CC, DD. The rings AA, BB are interconnected through sharing the nodes 12B, 12D, the rings BB, CC are interconnected through a link between the nodes 12H, 12J, the rings BB, DD are interconnected through a link between the nodes 12G, 12U, and the rings CC, DD are interconnected through a link between the nodes 12K, 12P.

Again, the group ID can be used to cluster risks so that each SRLGBC has many bits set as opposed to a few bits. In an exemplary embodiment for an approach to the group ID, the network 50 which is built as a series of interconnected rings AA, BB, CC, DD (with occasional cut-through) then the rings AA, BB, CC, DD offer a good approach to clustering, i.e., all network risks, e.g., fiber cables, in a particular ring can be assigned a unique bit index. Thus, in an exemplary embodiment, each group ID is set to one of the rings AA, BB, CC, DD. Because network risks in many rings (clusters) need to be represented, the group ID can be set such that a bit index K in the ring AA (cluster) and a bit index K in the ring BB (cluster) do not equate to the same network risk, i.e., both indexes (Ks) represent different network risks as they occur in different rings (clusters).

In an exemplary embodiment, assuming a 32-bit vector, the SRLGBV can be set with an 8-bit group ID and 24-bits to represent 24 network risks per ring. If more than 24 different network risks exist in a cluster (ring) then the cluster (ring) may be subdivided (different group IDs), or alternatively, two or more 32-bit values used to represent a single SRLGBV of length>24. The notation adopted is GroupID.bitVector, where bit k is set (value 1) if network risk k is used, e.g., AA.11010→network risks 1, 2 and 4 are used in the ring AA.

In FIGS. 3A and 3B, each link is shown with a number which is indicative of a bit index in the associated SRLGBV for that ring. That is, the SRLG values here represent shared fibers. In FIG. 3A, there is an exemplary connection 52 between the node 12A in the ring AA and the node 12G in the ring BB. Assume in a conventional SRLG approach, the connection has four risks—two on each of the rings AA, BB, e.g., traditional SRLG={A2E, E3D, D4F, F3G} for four 32-bit values. With the SRLGBV, these four 32-bit values can be represented by two-bit vectors—one for each of the rings AA, BB, e.g., New SRLGBV={AA.011000, BB.0011}.

When two rings (clusters) share a network risk, then a bit index is generated for only one ring (cluster). For example, on the link between the nodes 12B, 12D which is shared between the rings AA, BB, a bit index number 4 in ring (cluster) AA and no bit index is generated for this network risk in the ring BB (cluster). Also, when two rings (clusters) are interconnected such that they share a network risk, then a bit index is generated for only one ring (cluster). For example, in the case of the link between the nodes 12K, 12P, the bit index number 4 is generated in the ring CC (cluster), and no bit index is generated for this network risk in the ring DD (cluster).

Diversity Calculations

Assume a Network Management System (NMS), Element Management System (EMS), Path Computation Element (PCE), etc. is used for nominal path calculation at initial service creation. The network element (NE) can perform reroute path calculations to recover service from a failure (e.g., a network risk failure). The SRLGBVs can be used by any of the NMS, EMS, PCE, NE, etc. to perform diverse route calculations. The systems and methods herein contemplate the use of any path computation technique to determine two paths, and the SRLGBV of the two paths are compared to determine if the two paths are route diverse.

The diverse route calculation can be a shortest-pair by the NMS, EMS, etc. for nominal paths or exclusion-based by NEs for reroutes. Conventionally, as described herein, SRLG conflict is detected by comparing SRLG values directly, i.e., a link X with SRLG=12345 and a link Y with SRLG=12345 have a conflicting network risk represented by SRLG=12345. In the SRLGBVs, conflict is detected by comparing SRLGBV's bit indexes of the same group ID (using bit-wise operation), i.e., a link with SRLGBV=AA.1010 and a link with SRLGBV=AA.0011 have a conflicting network risk represented by network risk for which index number 3 was assigned in cluster or group AA.

In an exemplary application, the SRLGBVs are introduced to reduce the number of SRLGs that need to be pushed to NEs for diversity based route calculations during reroutes as a result of failures. For example, a protected tunnel including two Label Switched Paths (LSPs) experiences a fault on one LSP requiring the failed LSP to be rerouted but in such a way as to be diverse (strictly or maximally) to the non-failed LSP. Another example is for a Fast Reroute (FRR) bypass LSP to be routed on a path that is diverse (strictly or maximally) to the LSP it is protecting.

In the case of reroutes associated with protected tunnels, the NE knows the SRLGBVs of the non-failed LSP and thus during rerouting it attempts to find a route for the failed LSP such that this route uses zero (strict diversity) or as few (maximal diversity) network risks that are used by the non-failed LSP. In another example, when a Dijkstra-based algorithm wants to explore a neighbor across a link, it typically asks the question: would using the link for the failed LSP (or other connection) violate diversity with the non-failed LSP? This can be easily answered by comparing the SRGBV values of the link against the known SRLGBV values of the non-failed LSP as described above, i.e., using bit-wise operations on bit indexes of the same cluster.

FIG. 3B illustrates a protected tunnel example in the network 50. Here, there is a primary LSP 54 which traverses all four rings AA, BB, CC, DD between the nodes 12A, 12R and a backup LSP 56 which traverses three rings AA, BB, DD between the nodes 12A, 12R. FIG. 3B further illustrates links labeled as Blue 60-1, Yellow 60-2, Pink 60-3, Black 60-4, Red 60-5, and Green 60-6 with associated SRLGBVs. In this example, there is a failure 58 on the backup LSP 56. The objective is to reroute the failed backup LSP 56 to be diverse to the primary LSP 54 with SRLGBV={AA.100010, BB.1000, CC.00011100, DD.0110000}. A route through the Pink 60-3 link would result in SRLGBV={AA.011000, BB.0011, DD.11100001} and would conflict with network risks for which indexes 2 and 3 were assigned in cluster DD (D.0110000 BITWISE_AND DD.11100001 !=0). The route through the Black 60-4 link would result in SRLGBV={AA.011000, BB.0011, DD.00010011} and does not conflict with the SRLGBV of the primary LSP 54 and thus failed the backup LSP 56 should be rerouted to pass through Green 60-6 and Black 60-4 Links.

Generalized Clustering

Figure 4:
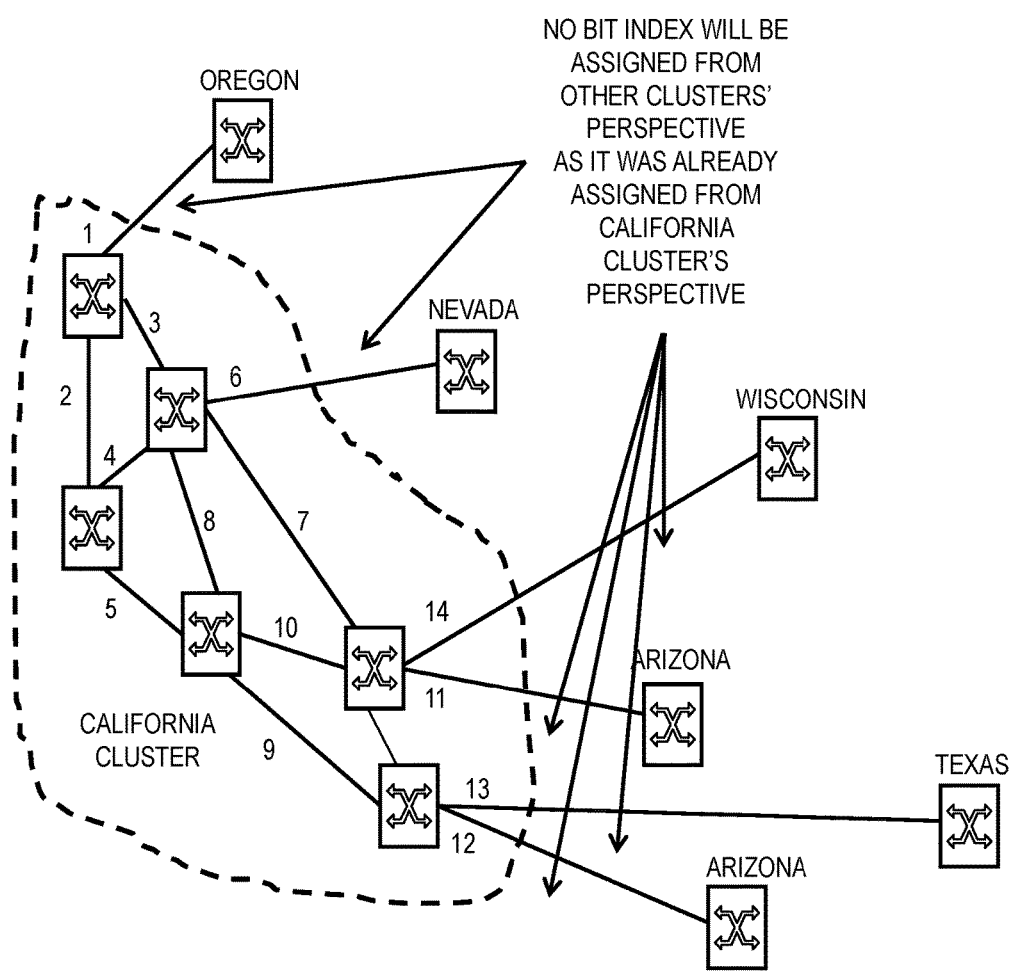
FIG. 4 is a network diagram of a network for a generalized approach to clustering based on geography.

Referring to FIG. 4, in an exemplary embodiment, a network diagram illustrates a network 65 for a generalized approach to clustering based on geography. One of the challenges for the SRLGBV approach is to intelligently define the clusters to ensure SRLGBVs have many bits set as opposed to just one or two bits set otherwise SRLGBV just degenerates to a simple SRLG, i.e., an SRLGBV with only single bit set equates to an SRLG. In the previous example, it was shown how rings could define clusters, but another approach for defining clusters may be to use geographical locations, e.g., Global Positioning Satellite (GPS) bounded quadrants or province/state boundaries, telephone area code boundaries, or any other geographical distinction. Geographically based clusters can be defined, and the bit index values can be assigned for network risks relative to such geographical clusters. Again, similar to the ring example above, if a network risk (e.g., a fiber cable) spans more than one geographical cluster, then bit index value is only generated for exactly one geographical cluster. In FIG. 4, a cluster is defined for all nodes in California, i.e., the California cluster. Note, there are links that extend from the California cluster to other nodes in different clusters (e.g., Oregon, Nevada, Wisconsin, etc.). Again, no bit index is assigned for risks on these links as it will already be assigned from the California cluster's perspective. That is, if a risk extends between two clusters, it only needs to be defined in one of the clusters.

Figure 5:
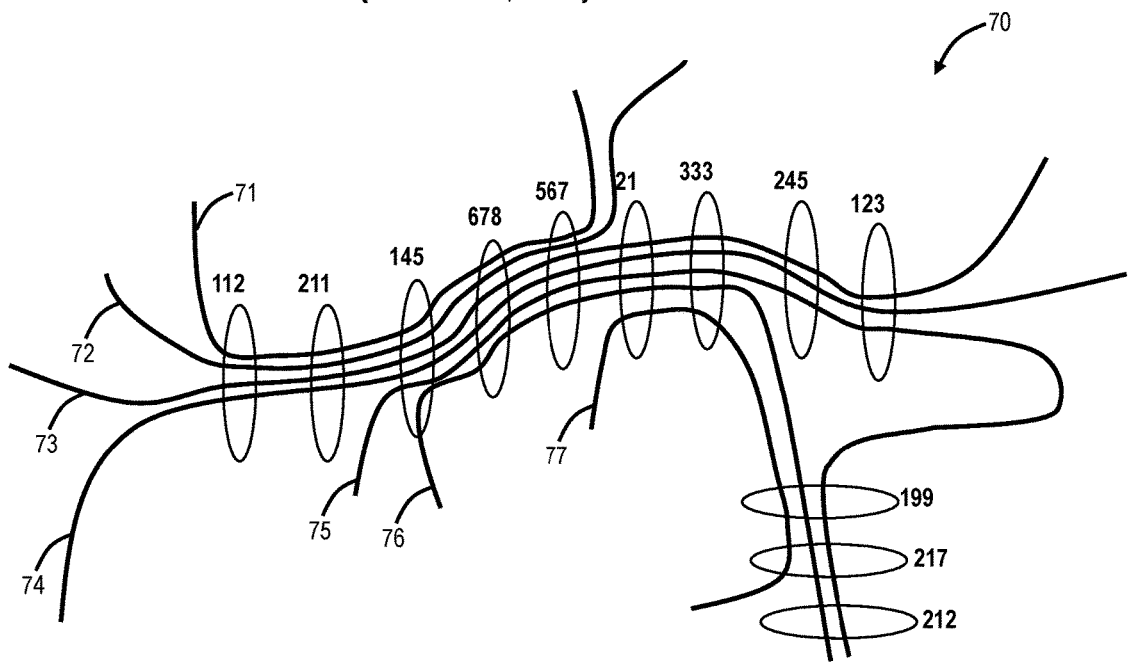
FIG. 5 is a network diagram of a network for another approach to clustering based on upper-layer links.

Referring to FIG. 5, in an exemplary embodiment, a network diagram illustrates a network 70 for another approach to clustering based on upper-layer links. Here, the clustering finds groups of network risks that are used by many upper-layer links. For example, assume there are 4 packet links and each passes over the following L0 network risks set {112, 211, 145, 678, 567, 21, 333, 245, 123}. A cluster BB could be defined to represent such a set where bit indexes represent the network risks in the set, i.e., bit index 1 representing 112, bit index 2 representing 211, etc. and the resulting SRLGBV would be SRLGBV={BB.1111111}. Thus, each of the 4 packet links would be assigned SRLGBV={BB.1111111} instead of SRLG={112, 211, 145, 678, 567, 21, 333, 245, 123}. A second cluster could be defined, CC, to represent the network risk set {199, 217, 212} with bit index 1 representing 199, bit index 2 representing 217, etc.

In the example of FIG. 5, Links 73, 74 have SRLGBV={BB.111111111}, Links 75, 76 have SRLGBV={BB.001111100, CC.111}, Links 71, 72 have SRLGBV={BB.111110000, CC.111} and Link 77 has SRLGBV={BB.000001100, CC.110}.

This approach here for clustering requires finding some (ideally a least) number of element sets given several multi element sets such that all elements are accounted for. For example, assume the following sets of network risks: S1={1, 3, 4, 5, 6, 7, 8, 9, 15}, S2={2, 4, 5, 6, 7, 10, 11, 12}, S3={1, 7, 8, 9, 10, 14, 15}, and S4={2, 3, 4, 9, 10}. The found sets could be as simple as: T1={1, 2, 3, 4, 5}, T2={6, 7, 8, 9, 10}, and T3={11, 12, 13, 14, 15}. For each Ti, generate an SRLGBVii and apply such SRLGBV against sets Sj: S1's SRLGBV={11.10111, 22.11110, 33.00001}→9 compressed to 3 32-bit numbers, S2's SRLGBV={11.01011, 22.11001, 33.11000}→8 compressed to 3 32-bit numbers, S3's SRLGBV={11.10000, 22.01111, 33.00011}→7 compressed to 3 32-bit numbers, and S4's SRLGBV={11.01110, 22.00011}→5 compressed to 2 32-bit numbers. Note that very little intelligence was afforded to select the sets Ti and yet it still yielded good compression. That is, complex analysis is not required in clustering to yield significant compression.

Compression

Again, SRLGBVs allow compression of many SRLG values. With a format of 8 bit Group ID and 24 bit indexes, compression can be 24×-24× less storage, 24× less flooding bandwidth, and even processing during path computation is reduced, i.e., comparing a set of N 32-bit SRLG values is more computationally expensive than performing a bit-wise operation on a 24 bit SRLGBV to determine diversity conflicts. Note that this compression is theoretical and likely not achievable in practice, i.e., to get 24× compression one would have to find an algorithm whereby all bits were set in every SRLGBV. This is probably not achievable. In the examples herein, a compression of 3×, 2×, 4× is achieved which is still good, i.e., compressing 30 SRLGs into a dozen SRLGs is still quite beneficial, i.e., compression of 2×, 3×, 4× is still beneficial.

The SRLGBV can be flooded in a distributed control plane network (e.g., Generalized Multiprotocol Label Switching (GMPLS)) using an existing routing protocol (e.g., Open Shortest Path First (OSPF)/Intermediate System-Intermediate System (ISIS)/Border Gateway Protocol (BGP)) extensions related to SRLGs. If SRLGBVs are confined to 32 bits in length, the SRLGBV can operate in the conventional approaches for control planes and routing protocols which generally support 32-bit SRLG values. It would however be necessary for network elements to know whether they operate on SRLGs or SRLGBVs. Alternatively, so as not to be confined to existing SRLG extensions in GMPLS OSPF/ISIS, new extensions for SRLGBV can be defined that would permit variable length SRLGBV values, and to differentiate between SRLGs and SRLGBVs.

Further partitioning can also be implemented for the Group ID. For example, if an 8-bit Group ID and 24-bit index is not sufficient, e.g., more than 24 Network Risks exist in a particular cluster then either the cluster is split apart (e.g., cluster AA is split into AA1 and AA2) or the format can be adjusted, e.g., 8-bit Group ID, a 2-bit Set ID, and 22 bits to represent 22 different network risks in the cluster in the given set, one bit per network risk. Such representation would allow for each 8-bit Cluster ID to hold 22×4=88 different network risks (where the 4 is for the Set ID). For example, say a cluster needs specification of 40 network risks {101, 102, . . . , 140} then this can be represented as two SRLGBVs: first SRLGBV—8-bit Cluster ID=AA, 2-bit Set ID=00, and 22 bits for the first 22 Network Risks {101, . . . , 122} and a second SRLGBV—8-bit Cluster ID=AA, 2-bit Set ID=01, and 22 bits for the remaining 18 Network Risks {123, . . . , 140}.

Exemplary Network Element/Node

Referring to FIG. 6, in an exemplary embodiment, a block diagram illustrates an exemplary node 100 for use with the systems and methods described herein. In an exemplary embodiment, the exemplary node 100 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another exemplary embodiment, the node 100 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the node 100 can be any digital and/or optical system with ingress and egress digital and/or optical signals and switching of channels, timeslots, tributary units, wavelengths, etc.

In an exemplary embodiment, the node 100 includes common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a Network Management System (NMS) 108 through a data communication network 110 (as well as a Path Computation Element (PCE), a Software Defined Networking (SDN) controller, etc.). The NMS 108 can also be an Element Management System (EMS), or the like. Additionally, the common equipment 102 can include a control plane processor, such as a controller 200 illustrated in FIG. 7 configured to operate the control plane as described herein. The node 100 can include an interface 112 for communicatively coupling the common equipment 102, the line modules 104, and the switch modules 106 to one another. For example, the interface 112 can be a backplane, midplane, a bus, optical and/or electrical connectors, or the like. The line modules 104 are configured to provide ingress and egress to the switch modules 106 and to external connections on the links to/from the node 100. In an exemplary embodiment, the line modules 104 can form ingress and egress switches with the switch modules 106 as center stage switches for a three-stage switch, e.g. a three-stage Clos switch. Other configurations and/or architectures are also contemplated.

Further, the line modules 104 can include a plurality of optical connections per module and each module may include a flexible rate support for any type of connection. The line modules 104 can include WDM interfaces, short reach interfaces, and the like, and can connect to other line modules 104 on remote network elements, end clients, edge routers, and the like, e.g., forming connections on the links in the networks 10, 50, 65, 70. From a logical perspective, the line modules 104 provide ingress and egress ports to the node 100, and each line module 104 can include one or more physical ports. The switch modules 106 are configured to switch channels, timeslots, tributary units, packets, etc. between the line modules 104. For example, the switch modules 106 can provide wavelength granularity (Layer 0 switching); OTN granularity; Ethernet granularity; and the like. Specifically, the switch modules 106 can include Time Division Multiplexed (TDM) (i.e., circuit switching) and/or packet switching engines. The switch modules 106 can include redundancy as well, such as 1:1, 1:N, etc.

Those of ordinary skill in the art will recognize the node 100 can include other components which are omitted for illustration purposes, and that the systems and methods described herein are contemplated for use with a plurality of different network elements with the node 100 presented as an exemplary type of network element. For example, in another exemplary embodiment, the node 100 may not include the switch modules 106, but rather have the corresponding functionality in the line modules 104 (or some equivalent) in a distributed fashion. For the node 100, other architectures providing ingress, egress, and switching are also contemplated for the systems and methods described herein. In general, the systems and methods described herein contemplate use with any network element providing switching of channels, timeslots, tributary units, wavelengths, etc. Furthermore, the node 100 is merely presented as one exemplary node 100 for the systems and methods described herein.

Exemplary Controller

Figure 7:
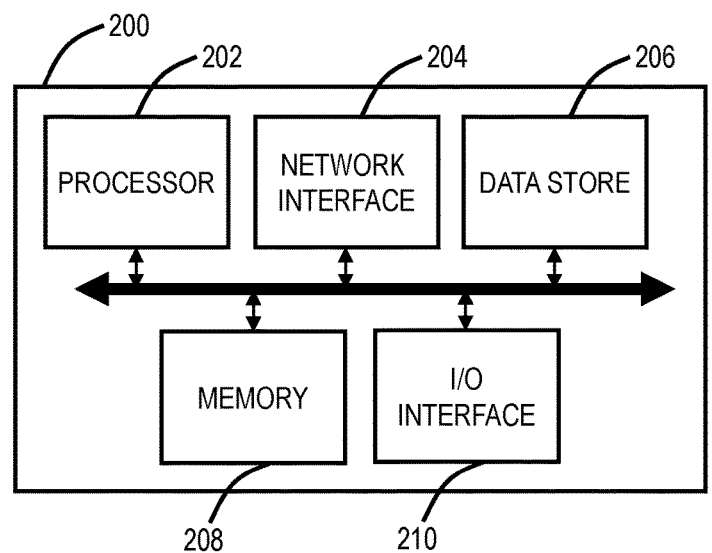
FIG. 7 is a block diagram of a controller to provide control plane processing and/or operations, administration, maintenance, and provisioning (OAM&P) for the node.

Referring to FIG. 7, in an exemplary embodiment, a block diagram illustrates a controller 200 to provide control plane processing and/or operations, administration, maintenance, and provisioning (OAM&P) for the node 100. The controller 200 can be part of the common equipment, such as common equipment 102 in the node 100, or a stand-alone device communicatively coupled to the node 100 via the DCN 110. In a stand-alone configuration, the controller 200 can be the NMS 108, a PCE, etc. The controller 200 can include a processor 202 which is a hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chip set), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 54 can be used to enable the controller 200 to communicate on the DCN 40, such as to communicate control plane information to other controllers, to the management system 108, to the nodes 100, and the like. The network interface 204 can include, for example, an Ethernet module. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Further, the I/O interface 210 includes components for the controller 200 to communicate with the other nodes, such as using overhead associated with OTN signals.

In an exemplary embodiment, the controller 200 is configured to communicate with other controllers 200 in the networks 10, 50, 65, 70 to operate the control plane for control plane signaling. This communication may be either in-band or out-of-band. Out-of-band signaling may use an overlaid Internet Protocol (IP) network such as, for example, User Datagram Protocol (UDP) over IP. In an exemplary embodiment, the controllers 50 can include an in-band signaling mechanism utilizing Optical Transport Network (OTN) overhead.

The controller 200 is configured to operate the control plane in the networks 10, 50, 65, 70. That is, the controller 200 is configured to implement software, processes, algorithms, etc. that control configurable features of the networks 10, 50, 65, 70, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 200 can include a topology database that maintains the current topology of the networks 10, 50, 65, 70 based on control plane signaling and a connection database that maintains available bandwidth on the links again based on the control plane signaling as well as management of the SRLGBVs for diverse path computation.

Again, the control plane can be a distributed control plane; thus, a plurality of the controllers 50 can act together to operate the control plane using the control plane signaling to maintain database synchronization. In source-based routing, the controller 200 at a source node for a connection is responsible for path computation and establishing by signaling other controllers 200 in the networks 10, 50, 65, 70, such as through a SETUP message. For example, the source node and its controller 200 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP.

Figure 8:
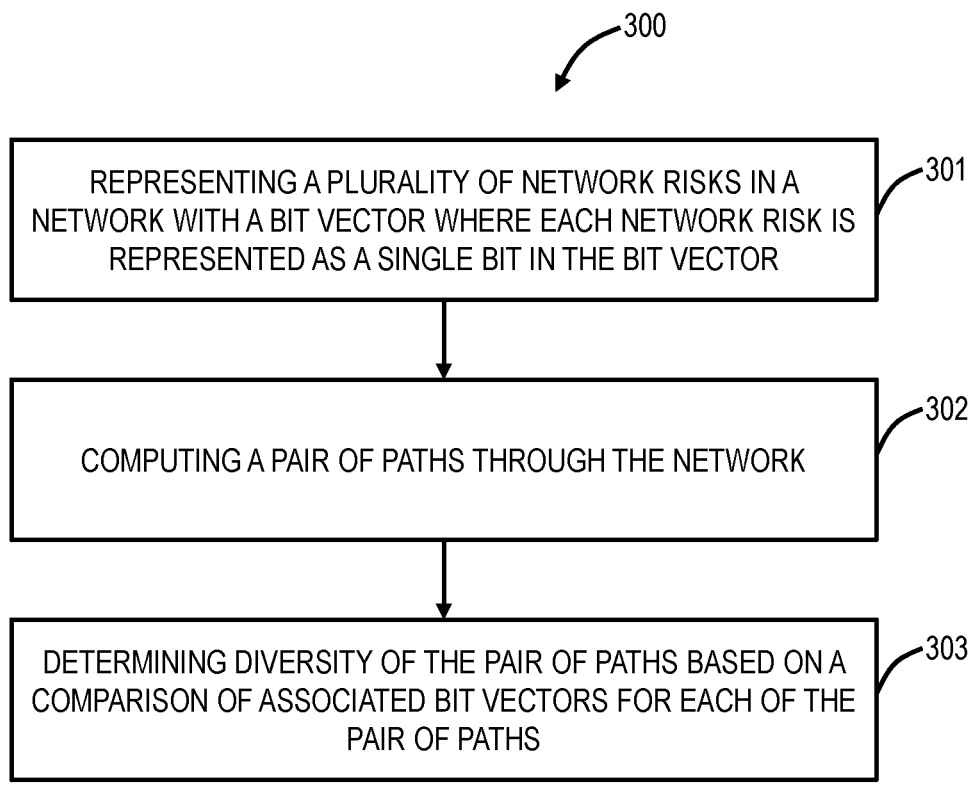
FIG. 8 is a flowchart of a process for path computation using an efficient shared risk group representation.

Process for Path Computation Using the Efficient Shared Risk Group Representation Referring to FIG. 8, in an exemplary embodiment, a flowchart illustrates a process 300 for path computation using an efficient shared risk group representation. The process 300 includes representing a plurality of network risks in a network with a bit vector where each network risk is represented as a single bit in the bit vector (step 301); computing a pair of paths through the network (step 302); and determining diversity of the pair of paths based on a comparison of associated bit vectors for each of the pair of paths (step 303). The bit vector can include M-bits with an N-bit Group Identifier and P-bits with each of the P-bits representing a unique risk of the plurality of network risks, wherein M, N, and P are integers and N+P=M. Optionally, M=32 and the bit vector is used in place of a Shared Risk Link Group of 32-bits which represents a single risk. The Group Identifier can be used to cluster the plurality of network risks based on one or more of network topology, geography, upper layers, and clustering to find a largest number of the P-bits intersecting between groups. The plurality of network risks can be flooded as the associated bit vectors via a control plane. The determining of the diversity can be based on a bitwise comparison of the associated bit vectors. The plurality of network risks can be defined at one or more lower layers and pushed to one or more upper layers higher than the lower layers as the associated bit vectors.

In another exemplary embodiment, an apparatus for path computation using an efficient shared risk group representation includes circuitry configured to represent a plurality of network risks in a network with a bit vector where each network risk is represented as a single bit in the bit vector; circuitry configured to compute a pair of paths through the network; and circuitry configured to determine diversity of the pair of paths based on a comparison of associated bit vectors for each of the pair of paths. In a further exemplary embodiment, a network element configured for path computation using an efficient shared risk group representation includes one or more ports supporting connections thereon; and a controller communicatively coupled to the one or more ports and configured to represent a plurality of network risks in a network with a bit vector where each network risk is represented as a single bit in the bit vector, compute a pair of paths through the network, and determine diversity of the pair of paths based on a comparison of associated bit vectors for each of the pair of paths.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of path computation using a shared risk group representation, the method comprising:
    in any of a Network Management System (NMS), an Element Management System (EMS), a Path Computation Engine (PCE), and a Network Element (NE), representing a plurality of network risks in a network with a plurality of bit vectors where each network risk is represented as a single bit in associated bit vector such that the associated bit vector represents multiple risks of the plurality of network risks;
    computing a pair of paths through the network by one of the NMS, EMS, PCE, and the NE; and
    determining diversity of the pair of paths based on a comparison of associated bit vectors for each of the pair of paths,
    wherein the bit vector comprises M-bits with an N-bit Group Identifier and P-bits with each of the P-bits representing a risk of the plurality of network risks, wherein M, N, and P are integers and N+P=M, and wherein the network employs the plurality of bit vectors to represent network risks using a single bit for each risk and the Group Identifier uniquely identifies each of the plurality of bit vectors.

2. The method of claim 1, wherein M=32 and the plurality of bit vectors are used in place of a Shared Risk Link Group of 32-bits which represents a single risk.

3. The method of claim 1, wherein the Group Identifier is used to cluster the plurality of network risks based on one or more of network topology, geography, upper layers, and clustering to find a largest number of the P-bits intersecting between groups.

4. The method of claim 1, wherein the plurality of network risks are flooded as the associated bit vectors via a control plane.

5. The method of claim 1, wherein the determining of the diversity is based on a bitwise comparison of the associated bit vectors.

6. The method of claim 1, wherein the plurality of network risks are defined at one or more lower layers and pushed to one or more upper layers higher than the lower layers as the associated bit vectors.

7. An apparatus for path computation using a shared risk group representation, the apparatus comprising:
    circuitry configured to represent a plurality of network risks in a network with a plurality of bit vectors where each network risk is represented as a single bit in an associated bit vector such that the associated bit vector represents multiple risks of the plurality of network risks;

circuitry configured to compute a pair of paths through the network; and circuitry configured to determine diversity of the pair of paths based on a comparison of associated bit vectors for each of the pair of paths, wherein each of the circuitry is in any of a Network Management System (NMS), an Element Management System (EMS), a Path Computation Engine (PCE), and a Network Element (NE), and wherein the bit vector comprises M-bits with an N-bit Group Identifier and P-bits with each of the P-bits representing a risk of the plurality of network risks, wherein M, N, and P are integers and N+P=M, and wherein the network employs the plurality of bit vectors to represent network risks using a single bit for each risk and the Group Identifier uniquely identifies each of the plurality of bit vectors.

8. The apparatus of claim 7, wherein M=32 and the plurality of bit vectors are used in place of a Shared Risk Link Group of 32-bits which represents a single risk.

9. The apparatus of claim 7, wherein the Group Identifier is used to cluster the plurality of network risks based on one or more of network topology, geography, upper layers, and clustering to find a largest number of the P-bits intersecting between groups.

10. The apparatus of claim 7, wherein the plurality of network risks are flooded as the associated bit vectors via a control plane.

11. The apparatus of claim 7, wherein the circuitry configured to determine the diversity performs a bitwise comparison of the associated bit vectors.

12. The apparatus of claim 7, wherein the plurality of network risks are defined at one or more lower layers and pushed to one or more upper layers higher than the lower layers as the associated bit vectors.

13. A network element configured for path computation using a shared risk group representation, the network element comprising:

one or more ports supporting connections thereon; and a controller communicatively coupled to the one or more ports and configured to represent a plurality of network risks in a network with a plurality of bit vectors where each network risk is represented as a single bit in an associated bit vector such that the associated bit vector represents multiple risks of the plurality of network risks, compute a pair of paths through the network, and determine diversity of the pair of paths based on a comparison of associated bit vectors for each of the pair of paths, wherein the bit vector comprises M-bits with an N-bit Group Identifier and P-bits with each of the P-bits representing a risk of the plurality of network risks, wherein M, N, and P are integers and N+P=M, and wherein the network employs the plurality of bit vectors to represent network risks using a single bit for each risk and the Group Identifier uniquely identifies each of the plurality of bit vectors.

14. The network element of claim 13, wherein M=32 and the bit vector is used in place of a Shared Risk Link Group of 32-bits which represents a single risk.

15. The network element of claim 13, wherein the Group Identifier is used to cluster the plurality of network risks based on one or more of network topology, geography, upper layers, and clustering to find a largest number of the P-bits intersecting between groups.

16. The network element of claim 13, wherein the plurality of network risks are flooded as the associated bit vectors via a control plane.

17. The network element of claim 13, wherein, to determine diversity, the controller performs a bitwise comparison of the associated bit vectors.

* * * * *